United States Patent
Maruyama

(10) Patent No.: US 9,772,020 B2
(45) Date of Patent: Sep. 26, 2017

(54) HOLLOW STRAIN WAVE GEARING AND HOLLOW ACTUATOR

(71) Applicant: Harmonic Drive Systems Inc., Shinagawa-ku, Tokyo (JP)

(72) Inventor: Toshiki Maruyama, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/772,440

(22) PCT Filed: May 16, 2014

(86) PCT No.: PCT/JP2014/063099
§ 371 (c)(1),
(2) Date: Sep. 3, 2015

(87) PCT Pub. No.: WO2015/173959
PCT Pub. Date: Nov. 19, 2015

(65) Prior Publication Data
US 2017/0051817 A1  Feb. 23, 2017

(51) Int. Cl.
*F16H 49/00* (2006.01)
*F16H 57/025* (2012.01)
*F16H 57/029* (2012.01)
*F16H 57/04* (2010.01)

(52) U.S. Cl.
CPC ......... *F16H 49/001* (2013.01); *F16H 57/025* (2013.01); *F16H 57/029* (2013.01); *F16H 57/04* (2013.01); *F16H 2049/003* (2013.01)

(58) Field of Classification Search
CPC .............................. F16H 49/001; F16H 57/029

USPC .......................................................... 74/640
See application file for complete search history.

(56) References Cited

U.S. PATENT DOCUMENTS

| | | | |
|---|---|---|---|
| 6,065,362 A | 5/2000 | Kiyosawa et al. | |
| 2002/0135241 A1 | 9/2002 | Kobayashi et al. | |
| 2011/0116962 A1 | 5/2011 | Kanayama | |
| 2014/0283638 A1* | 9/2014 | Yajima ................. | F16H 49/001 74/412 R |
| 2015/0300475 A1* | 10/2015 | Murayama et al. .. | F16H 49/001 74/640 |

FOREIGN PATENT DOCUMENTS

| | | |
|---|---|---|
| JP | 9-303497 A | 11/1997 |
| JP | 2001-304382 A1 | 10/2001 |

(Continued)

OTHER PUBLICATIONS

International Search Report (PCT/ISA/210) dated Aug. 19, 2014, by the Japanese Patent Office as the International Searching Authority for International Application No. PCT/JP2014/063099.

*Primary Examiner* — William C Joyce
(74) *Attorney, Agent, or Firm* — Buchanan Ingersoll & Rooney PC

(57) ABSTRACT

A cup-type hollow strain wave gearing of a hollow actuator has a seal part assembled inside a cup-shaped externally toothed gear. The seal part seals between a boss of the externally toothed gear and a plug of the wave generator so as to prevent lubricant from leaking from the side of the externally toothed gear into a hollow part. Since the seal part employs an oil seal and an O-ring, it is able to be constituted inexpensively and to surely prevent leakage of low-viscosity lubricant.

9 Claims, 2 Drawing Sheets

(56) References Cited

FOREIGN PATENT DOCUMENTS

| | | | |
|---|---|---|---|
| JP | 2002-243000 A | | 8/2002 |
| JP | 2006-144971 A | | 6/2006 |
| JP | 2014-74451 | * | 4/2014 |
| WO | WO 2010/089796 A1 | | 8/2010 |

* cited by examiner

HOLLOW STRAIN WAVE GEARING AND HOLLOW ACTUATOR

TECHNICAL FIELD

The present invention relates to a hollow strain wave gearing provided with a hollow part extending therethrough along the direction of the center axis line, and to a hollow actuator having the hollow strain wave gearing and a hollow motor. In particular, the present invention pertains to a hollow strain wave gearing and a hollow actuator, in which a lubricant seal structure for preventing lubricant from leaking into the hollow part from a side of a cup-shaped flexible externally toothed gear is provided.

BACKGROUND ART

In a hollow strain wave gearing having a cup-shaped flexible externally toothed gear, a wave generator is arranged on the inner side of the cup-shaped externally toothed gear and a hollow part extends to pass through a boss of the externally toothed gear and a plug of the wave generator. Since the boss and the plug both arranged inside the externally toothed gear are positioned apart from each other in the direction of the center axis line, lubricant may pass through between these parts and leak into the hollow part from the side of the externally toothed gear. It is therefore necessary to seal between these parts. When it is desired to maintain a large hollow diameter, the seal structure is not able to assembled in the hollow part.

Patent Documents 1 and 2 propose, in a hollow actuator having a hollow strain wave gearing and a hollow motor, a lubricant seal structure for preventing lubricant from leaking into the hollow part and for preventing the leaked lubricant from entering the hollow motor side. The lubricant seal structure disclosed in these Patent Documents is provided with a labyrinth seal. The labyrinth seal is formed between the internal circumferential surface of the plug of the wave generator or the internal circumferential surface of the hollow input shaft integrally formed on the external circumferential surface thereof with the plug, and a sleeve (hollow shaft) extending to pass through the plug or the hollow input shaft.

PRIOR ART DOCUMENTS

Patent Documents

Patent Document 1: JP 2001-304382 A
Patent Document 2: JP 2006-144971 A

SUMMARY OF THE INVENTION

Problems to be Solved by the Invention

Here, there are problems in the labyrinth seal that the cost is generally expensive, reliability degrades when the viscosity of lubricant is low, and the like.

In view of the above, an object of the present invention is to provide a hollow strain wave gearing having a lubricant seal structure with high reliability and an inexpensive configuration, and to provide a hollow actuator having the hollow strain wave gearing.

Means to Solve the Problems

In order to achieve the above-mentioned object, a hollow strain wave gearing according to the present invention comprises:

a rigid internally toothed gear;
a cup-shaped externally toothed gear disposed inside the internally toothed gear and capable of flexing in a radial direction thereof;
a wave generator for flexing the externally toothed gear into anon-circular shape to mesh partially with the internally toothed gear and for moving meshed portions between the two gears in a circumferential direction, the wave generator being disposed inside the externally toothed gear;
a hollow part extending to pass through a boss and a plug of the wave generator in a direction of a center axis line, the boss defining a center portion of a bottom part in a cup shape of the externally toothed gear; and
a seal part for preventing lubricant from leaking between the boss and the plug into the hollow part.

The seal part has an oil seal housing attached to the boss inside the externally toothed gear; an annular seal sliding part formed on the plug; an annular first oil seal held in the oil seal housing and being made contact with the seal sliding part in a slidable state; and an annular second oil seal for sealing between the boss and the oil seal housing.

In the present invention, the oil seal housing is attached to the boss inside the cup-shaped externally toothed gear, whereby a rotating seal part is formed by the first oil seal accommodated in the oil seal housing and the seal sliding part on the plug of the wave generator. In addition, the second oil seal such as an O-ring seals between the boss and the oil seal housing. Thus, leakage of lubricant into the hollow part can be avoided by means of a highly reliable, inexpensive seal structure without employing a labyrinth seal or other unique seal mechanism.

Generally, the cup-shaped externally toothed gear has a cylindrical barrel part defining a barrel part of the cup shape and flexible in the radial direction; a diaphragm defining a bottom-part outer peripheral side part of the cup shape and extending inward in a radial direction from one end of the cylindrical barrel part to continue to the boss; and an external-tooth forming portion formed on the other end side of the cylindrical barrel part. In this case, an annular mounting groove in which the second oil seal is mounted is formed between a boss end face of the boss facing the oil seal housing and a housing end face of the oil seal housing facing the boss end face.

The cylindrical barrel part of the cup-shaped externally toothed gear is repeatedly flexed in the radial direction by the wave generator as the wave generator rotates. The diaphragm is repeatedly deflected about a root portion thereof continued to the boss in the direction of the center axis line in accordance with the deformation of the cylindrical barrel part.

Therefore, when the mounting groove is positioned adjacent to the boundary between the boss and the diaphragm, the boss end face and an end face portion of the housing end face adjacent to the outer peripheral side of the mounting groove are desirably positioned opposite to each other across a prescribed gap.

With this, interference of the diaphragm with the housing end face of the oil seal housing attached to the boss end face can be avoided, the diaphragm being repeatedly deflected in the direction of the center axis line. When the mounting groove is formed on the outer peripheral side of the boss end face in order to assure a large inside diameter of the hollow part, the possibility of interference of the diaphragm with the oil seal housing becomes high. By employing the above structure, the interference of the diaphragm with the oil seal housing can surely be prevented while maintaining a large inner diameter of the hollow part.

In the present invention, when the mounting groove is one that is formed on the housing end face, is opened toward the boss end face side and has a prescribed depth, an outer peripheral side end face portion of the housing end face adjacent to the outer peripheral side of the mounting groove is positioned opposite to the boss end face across the above-mentioned gap. In other words, the gap is formed to avoid interference with the diaphragm which is repeatedly deflected.

In the present invention, when the oil seal housing has a boss side mounting part formed with the housing end face and a cylindrical seal holding part for holding the oil seal, the seal sliding part may be disposed coaxially inside the seal holding part and the oil seal may be mounted between the seal holding part and the seal sliding part.

In the present invention, when a hollow input shaft is provided which is coaxially fixed to the plug of the wave generator, a third oil seal is desirably provided to seal between the wave generator and the hollow input shaft so that lubricant is prevented from leaking into the hollow part by passing between the wave generator and the hollow input shaft.

In this case, a sleeve extending to pass through the boss, the plug and the hollow input shaft may be disposed and the hollow part be defined by the internal circumferential surface of the sleeve.

In the present invention, when a hollow input shaft, which is integrally formed on the external circumferential surface thereof with the plug of the wave generator, is provided, the hollow part extends to pass through the boss and the hollow input shaft.

In this case, a sleeve may be disposed so as to extend to pass through the boss and the hollow input shaft, whereby defining the hollow part by the internal circumferential surface of the sleeve.

Next, a hollow actuator according to the present invention is characterized in comprising: the above hollow strain wave gearing provided with the sleeve; and a hollow motor provided with a hollow motor shaft, the hollow motor shaft being fixedly connected to the hollow input shaft of the hollow strain wave gearing or being formed integrally with the hollow input shaft, wherein the sleeve extends to pass through the hollow motor shaft, and the hollow part is defined by the internal circumferential surface of the sleeve and extends to pass through the hollow strain wave gearing and the hollow motor.

MODE FOR CARRYING OUT THE INVENTION

An embodiment of a hollow actuator having a hollow strain wave gearing, to which the present invention is applied, is described with reference to the drawings hereinafter.
(Overall Configuration)

Figure 1:
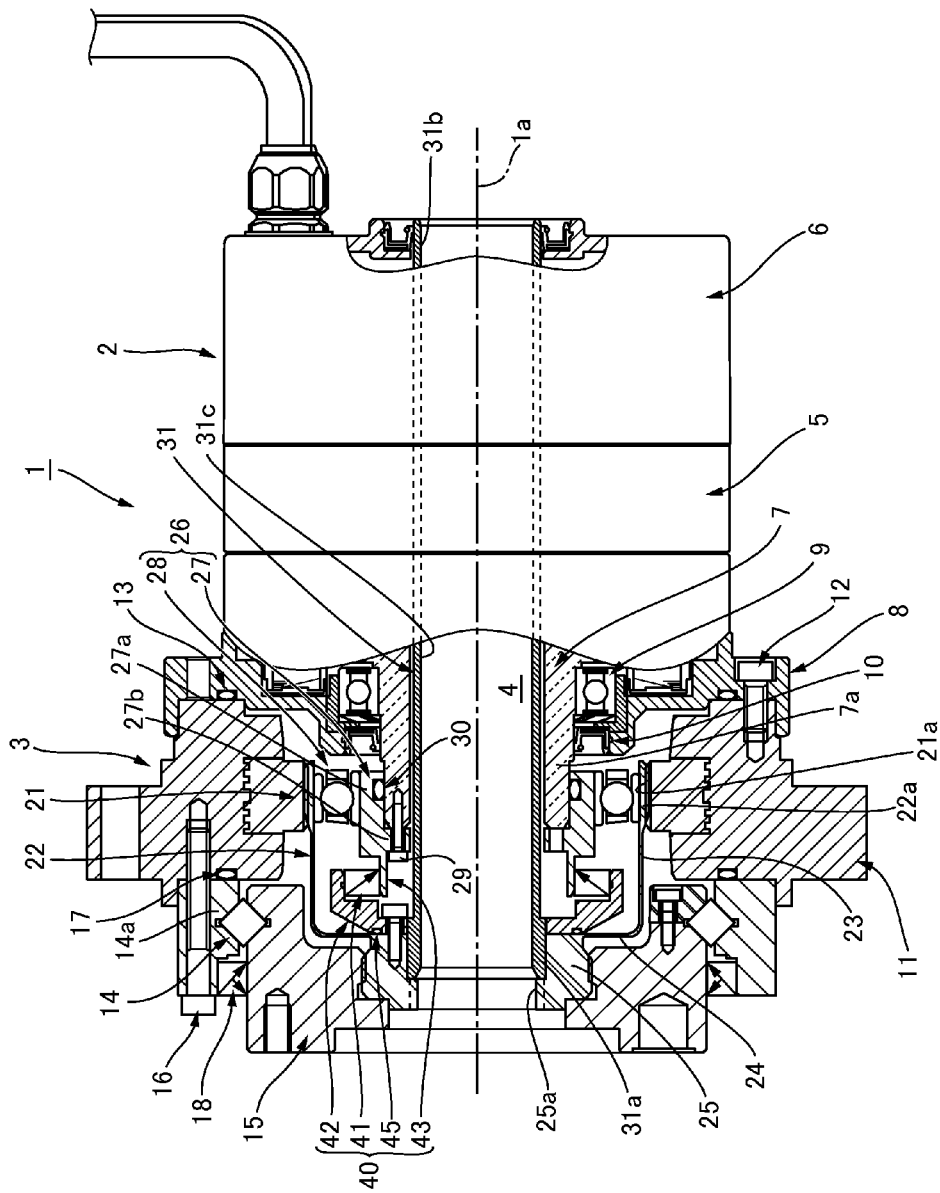
FIG. 1 is an explanatory view showing a hollow actuator provided with a hollow strain wave gearing, to which the present invention is applied.

FIG. 1 is an explanatory view showing a hollow actuator according to the present embodiment, in which a hollow strain wave gearing thereof is shown in a section. The hollow actuator 1 has a hollow motor 2 and a cup-type hollow strain wave gearing 3 coaxially connected to the hollow motor 2. A hollow part 4 extends to pass through the center portion of the hollow actuator 1 in the direction of a center axis 1a thereof.

The hollow motor 2 has a motor main body part 5, a motor encoder part 6 attached on the rear end of the motor main body part 5, and a hollow motor shaft 7 extending to pass through the motor center portion in the direction of the center axis 1a.

A motor flange 8 is disposed on the front end of the hollow motor 2, the motor flange 8 acting as a partition plate for partitioning between the motor main body part 5 and the hollow strain wave gearing 3. The motor flange 8 supports the hollow motor shaft 7 in a freely rotating manner. The hollow motor shaft 7 has a shaft front end part 7a on the front end side thereof, the shaft front end part projecting to the side of the hollow strain wave gearing 3 from the motor flange 8. The hollow motor shaft 7 functions as a hollow input shaft of the hollow strain wave gearing 3. It is possible that the hollow motor shaft and the hollow input shaft are arranged as separate component parts and are fixedly connected with each other. An oil seal 10 seals between the hollow motor shaft 7 and the motor flange 8.

The hollow strain wave gearing 3 has a cylindrical housing 11, and a rear end face of the housing 11 at the side of the motor is coaxially fastened to an outer peripheral side portion of a front end face of the motor flange 8 by means of fastening bolts 12. An O-ring 13 seals between the housing 11 and the motor flange 8. An annular output shaft 15, which is an actuator output member, is coaxially attached to a front end face of the housing 11 on the opposite side via a cross roller bearing 14.

In the present embodiment, an outer race 14a of the cross roller bearing 14 is coaxially fixed to the front end face of the housing 11 by fastening bolts 16. An O-ring 17 seals between the housing 11 and the outer race 14a. An inner race of the cross roller bearing 14 is integrally formed on the outer circumferential surface of the output shaft 15. Specifically, the single component part, or output shaft 15 functions as the inner race. An oil seal 18 seals between the output shaft 15 and the outer race 14a.

On the internal circumferential part of the housing 11, a circular rigid internally toothed gear 21 is integrally connected to the housing 11. A cup-shaped flexible externally toothed gear 22 is coaxially disposed inside the internally toothed gear 21. The external gear 22 is disposed in an orientation opening to the motor side, and has a cylindrical barrel part 23 flexible radially, a diaphragm 24 continued to the end of the cylindrical barrel part 23 on the side of the output shaft 15 and extending inward in the radial direction, and an annular rigid boss 25 continued to an inner peripheral edge of the diaphragm 24. The output shaft 15 is fixedly connected in a coaxial manner to the external circumferential surface of the boss 25.

As is described above, the cup shape of the externally toothed gear 22 is defined its bottom-part inner peripheral side portion by the boss 25, and is defined its bottom-part outer peripheral side portion by the diaphragm 24. The portion of the cylindrical barrel part 23 on the opening end side is an external-tooth forming part where external teeth 22a are formed in a manner opposing to internal teeth 21a of the internally toothed gear 21 from inner side.

The wave generator 26 is coaxially fitted on the inside of the external-tooth forming portion of the externally toothed gear 22. The wave generator 26 has an annular rigid plug 27, and a wave generator bearing 28 fitted on an external circumferential surface of the plug 27 having an ellipsoidal profile. The external-tooth forming portion of the externally toothed gear 22 is flexed into an ellipsoidal shape by the wave generator 26, so that the external teeth 22a are meshed with the internal teeth 21a on both ends of the major axis position of the ellipsoidal shape.

The plug 27 has a cylindrical part 27a and an annular part 27b projecting inward from the end part of the cylindrical part 27a. The shaft tip end part 7a of the hollow motor shaft 7 is inserted into the cylindrical part 27a so that the shaft tip end face of the shaft tip end part comes in contact with the annular end face of the annular part 27b. In this state, the annular part 27b and the shaft tip end part 7a are fixedly fastened by fastening bolts 29 attached from the side of the output shaft 15. The inner diameter dimension of the annular part 27b is substantially the same as the inner diameter dimension of the hollow motor shaft 7. An O-ring 30 (a third oil seal) seals between the cylindrical part 27a and the shaft tip end part 7a.

A cylindrical sleeve 31 extends coaxially to pass through the inner side of the hollow motor shaft 7 in a rotatable state. The front end part 31a of the sleeve 31 is fixed to the circular hollow part of the boss 25 of the externally toothed gear 22. The rear end part 31b of the sleeve 31 opens rearward from the rear end of the hollow motor 2. A hollow part 4, which extends to pass through the center part of the hollow actuator 1 in the direction of the center axis line 1a, is defined by the circular internal circumferential surface 31c of the sleeve 31 and the internal circumferential surface of the boss 25 positioned on the tip end side of the sleeve, the internal circumferential surface being a polygonal internal circumferential surface 25a, for example.

Here, the plug 27 and the boss 25 of the cup-shaped externally toothed gear 22 are apart from each other in the direction of the center axis line 1a inside the cup-type externally toothed gear 22. The gap between them is sealed by a seal part 40. The seal part 40 prevents lubricant in the cup-type externally toothed gear 22 from leaking into the hollow part 4 side through the gap or into the hollow motor 2 side passing between the hollow motor shaft 7 and the sleeve 31.

(Constitution of the Seal Part)

Figure 2:
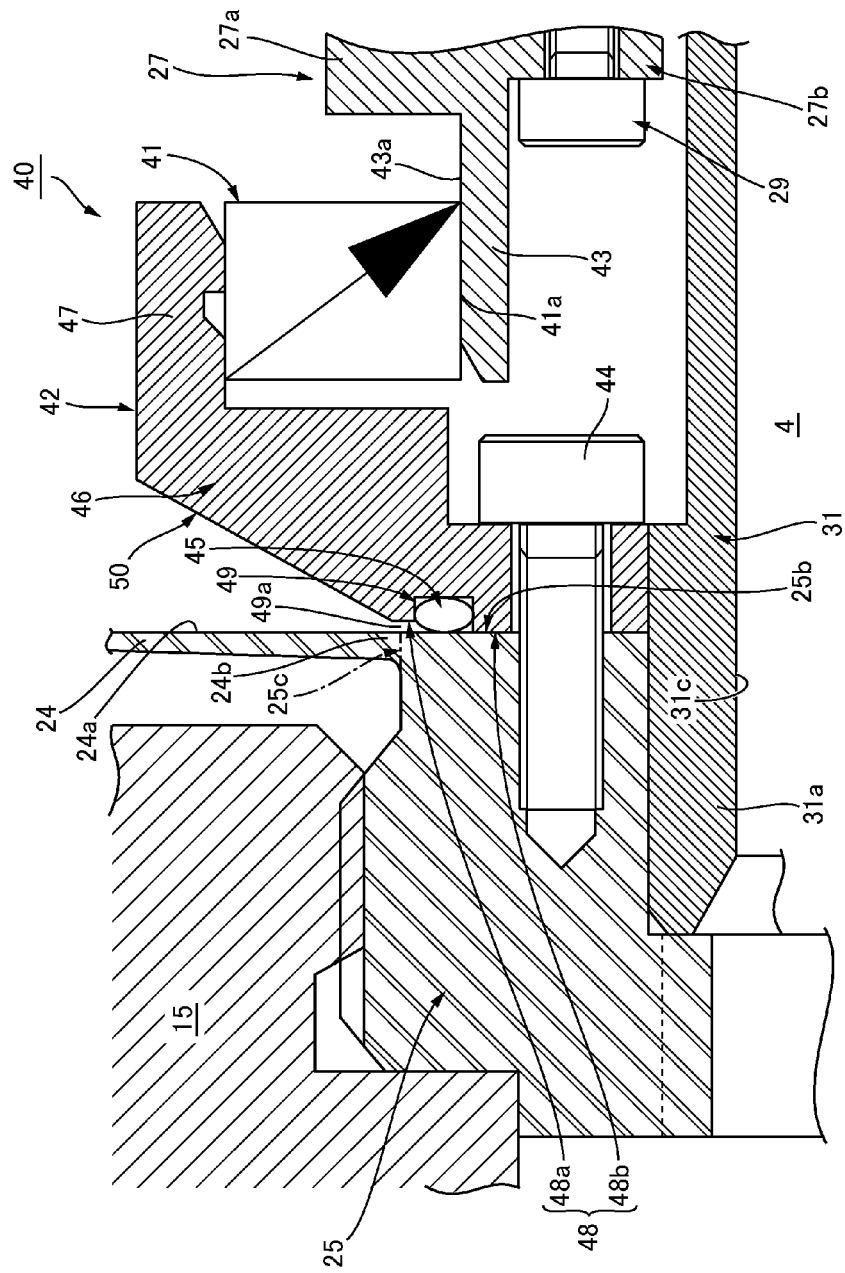
FIG. 2 is an enlarged partial sectional view showing a part of the hollow actuator of FIG. 1 in an enlarged manner.

FIG. 2 is an enlarged partial sectional view showing the seal part 40. With reference to FIGS. 1 and 2, the seal part 40 has an oil seal 41 (a first oil seal), an oil seal housing 42 for holding the oil seal 41, and a seal sliding part 43 to which the oil seal 41 is made to contact in a slidable state.

The oil seal housing 42 is disposed in the cylindrical barrel part 23 of the externally toothed gear 22, and is fixedly fastened to the boss 25 by fastening bolts 44 in a coaxial state. An O-ring 45 (a second oil seal) seals between the oil seal housing 42 and the boss 25. The seal sliding part 43 is integrally formed on the plug 27 of the wave generator 26 so that it projects cylindrically toward the boss 25 side.

In more detailed described, the boss 25 of the externally toothed gear 22 has an annular boss end face 25b continued from the inner-side end face 24a of the diaphragm 24. The inner-side end face 24a and the boss end face 25b are a plane orthogonal to the center axis line 1a in the present example (see FIG. 1). The boundary 25c between the boss 25 and the diaphragm 24 is denoted by dashed line.

The oil seal housing 42 fixed to the boss 25 has a boss mounting part 46 having a shape of circular truncated cone, and a seal holding part 47 projecting in a cylindrical shape toward the plug 27 from the outer peripheral position of the boss mounting part 46. The boss mounting part 46 has a housing end face 48 in contact with the boss end face 25b. The housing end face 48 is an annular end face whose size is substantially corresponding to the boss end face 25b. The outer periphery portion of the housing end face 48 is formed with a mounting groove 49 for mounting the O-ring 45. The mounting groove 49 is an annular recess part having a rectangular section and opening toward the boss end face 25b side.

In the housing end face 48 of the boss mounting part 46, the outer-side end face portion 48a of the mounting groove 49 on the outer peripheral side thereof is opposed to the root portion 24b of the diaphragm 24 continued to the boss 25. The outer-side end face portion 48a is a plane set back by a prescribed distance from the boss end face 25b. The fastening bolts 44 are attached to a position where the end face portion 48b in contact with the boss end face 25b is formed. A conical surface 50 inclined in the direction apart from the diaphragm 24 is continued from the outer peripheral edge of the outer-side end face portion 48a of the boss mounting part 46.

The mounting portion of the oil seal 41 will be explained. The cylindrical seal sliding part 43 on the plug 27 side is coaxially disposed inside the cylindrical seal holding part 47 of the oil seal housing 42. The oil seal 41 is accommodated between the seal holding part 47 and the seal sliding part 43. The oil seal 41 is held in the seal holding part 47 to form a rotating seal part, in which the circular internal circumferential surface 41a of the oil seal is pressed against the circular external circumferential surface 43a in a slidable state.

In the hollow actuator 1 as constituted above, when the hollow motor 2 is driven, the hollow motor shaft 7 rotates at high speed, and the wave generator 26 fixed to the hollow motor shaft 7 also rotates integrally at high speed. The rotation of the wave generator 26 makes to move the meshing positions between the externally toothed gear 22 and the internally toothed gear 21 in the circumferential direction. The number of teeth of the externally toothed gear 22 is 2n (n: positive integer), usually two, less than that of the internally toothed gear 21. Thus, the relative rotation is generated according to the difference in the number of teeth between the two gears. In this example, since the internally toothed gear 21 is set to be a fixed side, the externally toothed gear rotates. The rotation of the externally toothed gear 22 is derived from the output shaft 15 fixed thereto and is transmitted to a load member to be driven (not shown).

The seal part 40 which is assembled inside the cup-shaped externally toothed gear 22 of the hollow strain wave gearing 3, seals between the boss 25 and the plug 27. Whereby, lubricant do not leak from the side of the externally toothed gear 22 into the hollow part 4. Since the seal part 40 employs the oil seal 41 and the O-ring 45, it can be constituted inexpensively in comparison with a case where a seal structure such as a labyrinth seal or the like is employed. In addition, the seal part 40 is high in reliability because even a low-viscosity lubricant can surely be prevented from leaking.

Here, in a case of the cup-type hollow strain wave gearing 3 having the cup-shaped externally toothed gear 22, a large hollow part must be formed in the boss 25 of the externally toothed gear 22 in order to obtain a large hollow part 4. The formation of a large hollow part in the boss 25 makes the boss end face 25b, to which the oil seal housing 42 for holding the oil seal 41 is fixed, to become narrower. If the attachment part of the fastening bolts 44 for fixedly fastening the oil seal housing 42 to the boss 25 is secured, the mounting position of the O-ring 45 for sealing between the oil seal housing 42 and the boss 25 must be placed on the outer peripheral edge (the boundary 25c with the diaphragm 24). In other words, the mounting groove 49 of the O-ring 45 must be formed on the outer peripheral end side portion of the housing end face 48. As a result, the portion of the housing end face 48, which is located at the outer peripheral side of the mounting groove 49, comes to be in opposite to the root portion 24b of the diaphragm 24 connecting to the boss 25.

The diaphragm 24 is repeatedly deflected in the direction of the center axis line 1a centered about the root portion 24b connected to the boss 25 in accordance with the rotation of the wave generator 26. The deflected diaphragm 24 can interfere with the outer peripheral edge side portion of the housing end face 48 of the oil seal housing 42. In this example, the outer-side end face portion 48a of the housing end face 48 is made to set back from the diaphragm 24. Thus, The diaphragm 24 deflecting in the direction of the center axis line 1a will not interfere with the housing end face 48 of the oil seal housing 42 fixed to the boss 25.

Where the outer-side end face portion 48a of the housing end face 48 is made to set back from the boss end face 25b, the gap 49a is formed on the side of the outer-side end face portion 48a in the mounting groove 49 of the O-ring 45. However, during the operation of the hollow strain wave gearing 3, since the temperature of the inner side of the cup-shaped externally toothed gear 22 goes up, the inner pressure thereof also goes up. As a result, the O-ring 45 is deformed in the direction sticking to the internal circumferential surface potion on the radially internal side of the interior of the mounting groove 49. Whereby, the deterioration of the seal effect of the O-ring due to the formation of the gap 49a is avoided.

In the above-mentioned hollow actuator 1, the plug 27 of the wave generator 26 is fixedly fastened to the hollow motor shaft (hollow input shaft) by means of the fastening bolts 29. Alternatively, the hollow motor shaft 7 and the plug 27 can be formed as a single component part, in which the plug 27 is integrally formed on the external circumferential surface portion of the hollow motor shaft 7. The sleeve 31 may be omitted although the above-mentioned hollow actuator 1 is provided with the sleeve 31.

In the above example, the oil seal housing 42 is fixed to the boss 25 of the externally toothed gear 22 by the fastening bolts 44. The oil seal housing 42 may be fixed to the boss 25 with adhesive. In this case, the amount of coating of the adhesive must be controlled precisely. If the amount of coating is too little, reliability of adhered portion is degraded. On the contrary, an excessive amount of coating necessitates wiping operation of the excessive adhesive. The wiping operation is difficult if sufficient operation space for wiping adhesive cannot be secured.

The invention claimed is:

1. A hollow strain wave gearing, comprising:
a rigid internally toothed gear;
a cup-shaped externally toothed gear disposed inside the internally toothed gear and capable of flexing in a radial direction thereof;
a wave generator for flexing the externally toothed gear into a non-circular shape to mesh partially with the internally toothed gear and for moving meshed portions between the two gears in a circumferential direction, the wave generator being disposed inside the externally toothed gear;
a hollow part extending to pass through a boss of the externally toothed gear and a plug of the wave generator in a direction of a center axis line, the boss defining a center portion of a bottom part in a cup shape of the externally toothed gear; and
a seal part for preventing lubricant from leaking between the boss and the plug into the hollow part, wherein
the seal part has:
an oil seal housing attached coaxially to the boss inside the externally toothed gear; an annular seal sliding part formed on the plug;
an annular first oil seal held in the oil seal housing and being in contact with the seal sliding part in a slidable state; and
an annular second oil seal for sealing between the boss and the oil seal housing.

2. The hollow strain wave gearing according to claim 1, wherein
the externally toothed gear has: a cylindrical barrel part defining a barrel part of the cup shape and flexible in the radial direction; a diaphragm defining a bottom-part outer peripheral side part of the cup shape and extending inward in the radial direction from one end of the cylindrical barrel part to continue to the boss; and an external-tooth forming portion formed on the other end side of the cylindrical barrel part, and wherein
an annular mounting groove in which the second oil seal is mounted is formed between a boss end face of the boss facing the oil seal housing and a housing end face of the oil seal housing facing the boss end face,
the mounting groove is positioned adjacent to a boundary between the boss and the diaphragm, and
the boss end face and an end face portion of the housing end face are positioned opposite to each other across a prescribed gap, the end face portion being located adjacent to an outer peripheral side of the mounting groove.

3. The hollow strain wave gearing according to claim 2, wherein
the mounting groove is a groove formed on the housing end face, being opened toward the boss end face side and having a prescribed depth, and
an outer-side end face portion of the housing end face adjacent to an outer peripheral side of the mounting groove is positioned opposite to the boss end face across the gap.

4. The hollow strain wave gearing according to claim 1, wherein
the oil seal housing has a boss side mounting part formed with the housing end face and a cylindrical seal holding part for holding the oil seal,
the seal sliding part is disposed coaxially inside the seal holding part, and
the oil seal is mounted between the seal holding part and the seal sliding part.

5. The hollow strain wave gearing according to claim 1, further comprising:
a hollow input shaft coaxially fixed to the plug of the wave generator; and
a third oil seal for sealing between the wave generator and the hollow input shaft, wherein
the hollow part extends to pass through the boss, the plug and the hollow input shaft.

6. The hollow strain wave gearing according to claim 5, further comprising:
a sleeve extending to pass through the boss, the plug and the hollow input shaft, wherein
the hollow part is defined by an internal circumferential surface of the sleeve.

7. A hollow actuator, comprising:
the hollow strain wave gearing as set forth in claim 6;

a hollow motor provided with a hollow motor shaft, the hollow motor shaft being fixedly connected to the hollow input shaft of the hollow strain wave gearing or being formed integrally with the hollow input shaft, wherein the sleeve extends to pass through the hollow motor shaft, and the hollow part is defined by an internal circumferential surface of the sleeve and extends to pass through the hollow strain wave gearing and the hollow motor.

8. The hollow strain wave gearing according to claim 1, further comprising:

a hollow input shaft, on an external circumferential surface of which the plug of the wave generator is integrally formed, wherein the hollow part extends to pass through the boss and the hollow input shaft.

9. The hollow strain wave gearing according to claim 8, further comprising:

a sleeve extending to pass through the boss and the hollow input shaft, wherein the hollow part is defined by an internal circumferential surface of the sleeve.

* * * * *